US012548597B2

(12) United States Patent
Chen et al.

(10) Patent No.: US 12,548,597 B2
(45) Date of Patent: Feb. 10, 2026

(54) SYSTEM EVOLVING ARCHITECTURES FOR REFINING MEDIA CONTENT EDITING SYSTEMS

(71) Applicant: Lemon Inc., Grand Cayman (KY)

(72) Inventors: Fan Chen, Los Angeles, CA (US); Kin Chung Wong, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 99 days.

(21) Appl. No.: 18/346,737

(22) Filed: Jul. 3, 2023

(65) Prior Publication Data

US 2025/0014607 A1  Jan. 9, 2025

(51) Int. Cl.
*G11B 27/031* (2006.01)

(52) U.S. Cl.
CPC .................. *G11B 27/031* (2013.01)

(58) Field of Classification Search
CPC .................................... G11B 27/031
See application file for complete search history.

(56) References Cited

U.S. PATENT DOCUMENTS

| 11,960,500 | B1 | 4/2024 | Sboychakova et al. |
| 2008/0134282 | A1 | 6/2008 | Fridman et al. |
| 2017/0228384 | A1 | 8/2017 | Caruso et al. |
| 2019/0108276 | A1 | 4/2019 | Kovács et al. |
| 2019/0163728 | A1* | 5/2019 | Koren ................... G06F 40/131 |
| 2019/0179895 | A1 | 6/2019 | Bhatt et al. |
| 2019/0196696 | A1* | 6/2019 | Patel ....................... G06Q 50/01 |
| 2019/0196698 | A1 | 6/2019 | Cohen et al. |
| 2019/0259293 | A1 | 8/2019 | Hellman et al. |
| 2020/0005157 | A1 | 1/2020 | Rosenstein et al. |
| 2020/0066261 | A1* | 2/2020 | Ganz ........................ G06F 40/30 |
| 2021/0027065 | A1 | 1/2021 | Chung et al. |
| 2021/0157618 | A1 | 5/2021 | Moon |
| 2021/0272599 | A1 | 9/2021 | Patterson et al. |
| 2022/0108726 | A1* | 4/2022 | Li ......................... G11B 27/031 |
| 2022/0229832 | A1 | 7/2022 | Li et al. |

(Continued)

FOREIGN PATENT DOCUMENTS

| CN | 110389796 A | 10/2019 |
| CN | 111726676 A | 9/2020 |

(Continued)

OTHER PUBLICATIONS

Chang, Y. et al., "A Survey on Evaluation of Large Language Models," ACM Transactions on Intelligent Systems and Technology, vol. 15, No. 3, Mar. 29, 2024, 45 pages.

(Continued)

*Primary Examiner* — Sunghyoun Park
(74) *Attorney, Agent, or Firm* — Alleman Hall LLP (57) ABSTRACT

Examples are provided relating to system evolving architectures for refining media content editing systems. One aspect includes a method of refining a media content editing architecture, the method comprising: editing a media content using a large language model and a back-end tool service comprising a prompt pool and a plurality of application programming interfaces corresponding to a plurality of editing tools; publishing the edited media content; storing contextual information relating to the editing of the media content; and refining the media content editing architecture using the stored contextual information.

20 Claims, 8 Drawing Sheets

(56) References Cited

U.S. PATENT DOCUMENTS

| | | |
|---|---|---|
| 2023/0042221 A1 | 2/2023 | Xu et al. |
| 2023/0055241 A1 | 2/2023 | Zionpour et al. |
| 2023/0069133 A1 | 3/2023 | Matsuoka et al. |
| 2023/0074406 A1 | 3/2023 | Baeuml et al. |
| 2023/0135179 A1 | 5/2023 | Mielke et al. |
| 2023/0141807 A1 | 5/2023 | Groenewegen et al. |
| 2023/0244506 A1 | 8/2023 | Geller et al. |
| 2024/0038226 A1 | 2/2024 | Nouri et al. |
| 2024/0095077 A1 | 3/2024 | Singh et al. |
| 2024/0126997 A1* | 4/2024 | Bent, III ............ G06Q 30/0276 |
| 2024/0177739 A1 | 5/2024 | Su et al. |
| 2024/0179380 A1 | 5/2024 | Hannan et al. |
| 2024/0211439 A1 | 6/2024 | Shah et al. |
| 2024/0256773 A1 | 8/2024 | Correia Ribeiro et al. |
| 2024/0394502 A1 | 11/2024 | Sami et al. |
| 2025/0005051 A1 | 1/2025 | Khosla et al. |

FOREIGN PATENT DOCUMENTS

| | | |
|---|---|---|
| CN | 114430499 A | 5/2022 |
| CN | 115129212 A | 9/2022 |
| CN | 116187282 A | 5/2023 |
| EP | 4354887 A1 | 4/2024 |
| WO | 2022260188 A1 | 12/2022 |

OTHER PUBLICATIONS

ISA Intellectual Property Office of Singapore, International Search Report Issued in Application No. PCT/SG2024/050423, Sep. 24, 2024, WIPO, 4 pages.

ISA Intellectual Property Office of Singapore, International Search Report Issued in Application No. PCT/SG2024/050424, Sep. 20, 2024, WIPO, 3 pages.

ISA Intellectual Property Office of Singapore, International Search Report Issued in Application No. PCT/SG2024/050425, Jul. 11, 2024, WIPO, 3 pages.

ISA Intellectual Property Office of Singapore, International Search Report Issued in Application No. PCT/SG2024/050427, Aug. 23, 2024, WIPO, 4 pages.

Teubner, T. et al., "Welcome to the Era of ChatGPT et al.: The Prospects of Large Language Models," Business & Information Systems Engineering, vol. 65, No. 2, Mar. 13, 2023, 7 pages.

* cited by examiner

SYSTEM EVOLVING ARCHITECTURES FOR REFINING MEDIA CONTENT EDITING SYSTEMS

BACKGROUND

Raw media content in its original recorded form is typically edited before publication to enhance its appeal for better viewer engagement. Editing media content (e.g., images, audios, videos, and other modalities) typically involves the use of software with editing capabilities provided in the form of editing tools. Edits to media content can include a wide range of manipulations and modifications. For example, in the context of video editing, edits can include trimming segments, re-sequencing segments, adjusting playback speed, embedding content such as special effects and caption text, adjusting audio, cropping, etc. Additionally, the use of powerful editing software enables non-linear editing (NLE) systems where multiple edits are performed on raw media content in a non-destructive process such that the original data can be recovered—i.e., the edits can be reversed.

SUMMARY

Examples are provided relating to system evolving architectures for refining media content editing systems. One aspect includes a method of refining a media content editing architecture, the method comprising: editing a media content using a large language model and a back-end tool service comprising a prompt pool and a plurality of application programming interfaces corresponding to a plurality of editing tools; publishing the edited media content; storing contextual information relating to the editing of the media content; and refining the media content editing architecture using the stored contextual information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Media content editing software capable of providing powerful editing tools is widely available for commercial and personal uses. Typically, content editing software involves the use of a user interface (UI) with various sections, menus, buttons, etc. for navigating and selecting the desired editing tool. These technologies have grown over time to provide a vast array of tools for performing numerous editing tasks. However, software with more powerful editing capabilities and functionalities will naturally result in more complexity. As a result, many features remain unexplored for the typical user. Complex UI navigation, a lack of knowledge in the software's capabilities, and difficulty in utilizing said capabilities can all contribute to the underutilization of editing software. For example, a typical user of editing software may be unaware of or lack the ability to use a particular tool or feature of said software to perform their desired edits.

In view of the observations above, media content editing architectures utilizing machine learning techniques are provided. Technical architectures utilizing machine learning techniques can be configured in various ways to provide an intuitive media content editing application. Such applications can be configured to receive an editing request from a user and to perform one or more desired edits to a media content provided by the user. In some implementations, the media content to be edited is generated by the application. The editing request can be provided in the form of text, and machine learning techniques and natural language processing can be applied to translate the editing request into one or more edits to be performed. The edits can be performed, and the rendered results are provided to the user for evaluation. In some implementations, the editing process is performed as a nonlinear editing (NLE) process. Such implementations enable better utilization of the architecture's editing capabilities in a more flexible manner. The user may revert the edits or provide another editing request. The process can continue iteratively until the user is satisfied at which point the user publishes the edited media content.

Various machine learning techniques, such as deep learning models, can be applied. In some implementations, the media content editing architecture includes a large language model (LLM) for parsing and interpreting user input to predict one or more editing actions to be performed. The inference prediction can be performed based on conversational text interactions with the user through receiving user textual input and responding with dialog replies. The media content editing architecture can further include a prompt manager for providing a prompt in response to an editing request. The prompt can be retrieved from a prompt database. The prompt manager then fills the user's request into the provided prompt and feeds it to an LLM agent that utilizes the LLM to perform inference prediction, resulting in a list of instructions or actions corresponding to edits to be performed. The LLM agent can be further configured to perform said actions to edit the media content. To perform the edits, the LLM agent utilizes a register database of available editing tools to which the agent has access. The database can be linked to available editing tools and their associated application programming interfaces (APIs) that the LLM agent can utilize to perform editing actions.

In some implementations, the media content editing architecture is configured with a system evolving process that trains and refines the architecture. For example, the LLM and/or prompt database can be refined based on operational history and the edited media content. The media content editing architecture can be configured to save and store conversation history and/or contextual information (e.g., asset descriptions of the edited media content). To prevent dilution of effective samples, the media content editing architecture can be configured to save information for successful submissions (e.g., edited content that is ultimately published by the user). The saved information can be used to refine the media content editing architecture based on a predetermined reward function. For example, various indicators associated with an edited media content that has been published can be used to determine the reward function. Such indicators can include indicators that represent success of the edited media content in terms of view engagement. Examples of such indicators include views, comments, likes, shares, etc., associated with the published edited media content.

Figure 1:
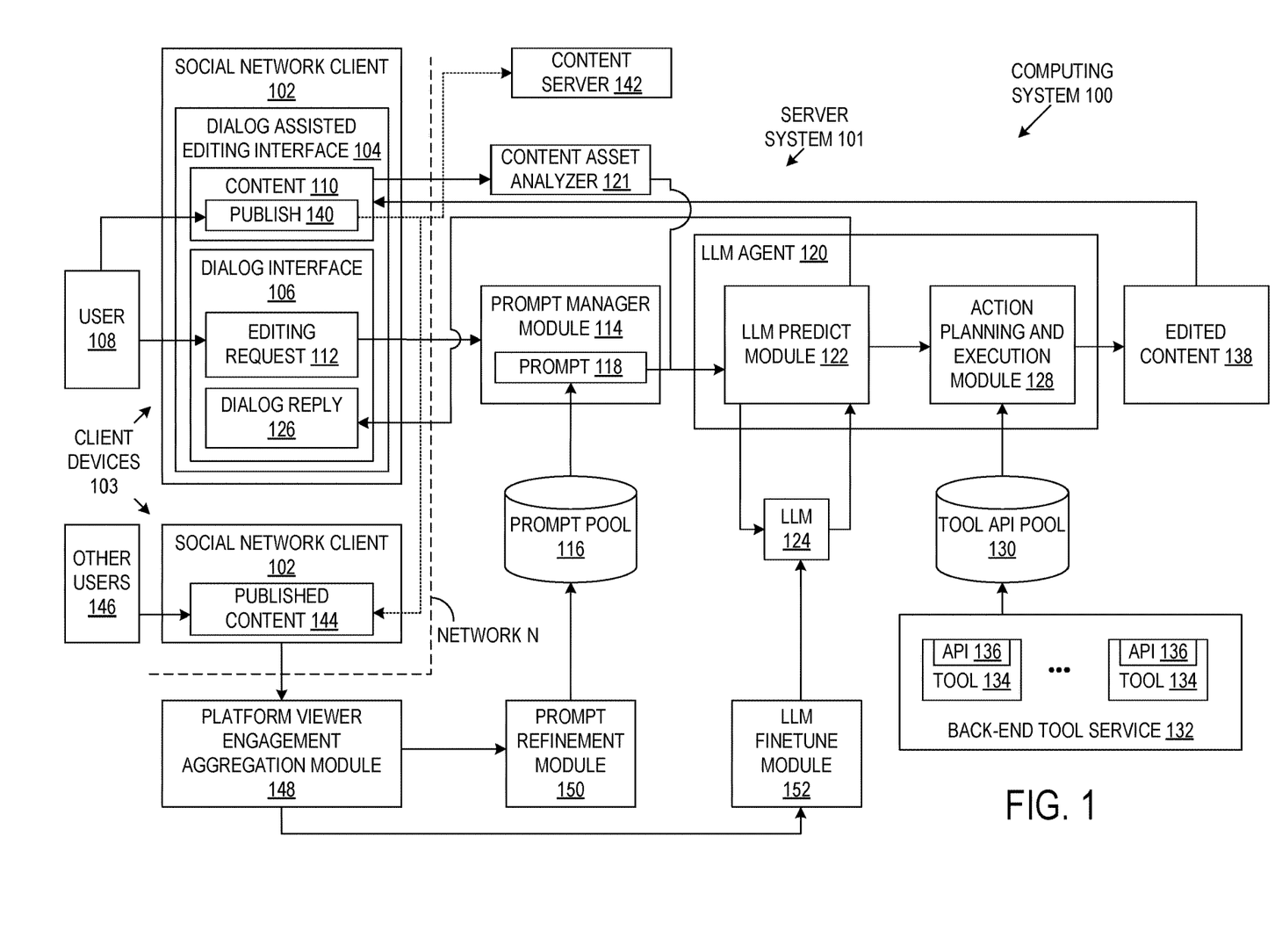
FIG. 1 shows a block diagram model describing a general pipeline and various components of an example technical architecture for implementing a media content editing application.

Turning now to the drawings, media content editing architectures utilizing machine learning techniques are illustrated and described in further detail. FIG. 1 shows a block diagram model illustrating a computing system 100. The block diagram model describes a general pipeline and various components of an example technical architecture for implementing a media content editing application in a client server environment. The computing system 100 includes a server system 101 including a plurality of server computing devices configured to execute the illustrated modules and services to thereby implement a social media network platform. The server system 101 is configured to communicate via a computer network N, such as the Internet, with a plurality of client computing devices 103, each executing a social network client 102. For example, the computing system 100 can implement a short-form video social media network, where users create, publish, share, and engage with short-form videos. In other implementations, the computing system 100 can be implemented as an offline application on a computing device. It will be appreciated that certain modules shown on the server system can be implemented on the client computing devices, such as the backend editing tools. Further, the social network client can be either a mobile client of the social media network, an effects editing software program executed on a personal computer, or other software.

The editing process is performed through a dialog assisted editing interface 104 that includes a dialog interface 106. A user 108 provides media content 110 that is to be edited along with an editing request 112. In some implementations, the media content 110 is generated by the media content editing application at the user's request. For example, generative machine learning techniques can be utilized to generate the media content. The media content 110 may be of various modalities. For example, the media content 110 can be an image, an audio recording, a video, etc. The media content 110 may be displayed through the dialog assisted editing interface 104. Additionally, edits performed on the media content 110 during the editing process may be displayed to the user 108 through said dialog assisted editing interface 104, allowing the user 108 to evaluate their next steps.

The editing request 112 is provided to a prompt manager module 114. In some implementations, the editing request 112 is provided in the form of textual input. In response, the prompt manager module 114 performs a query on a prompt pool 116 to retrieve a prompt 118. In some implementations, the retrieved prompt 118 is selected from the prompt pool 118 based on the editing request. The prompt pool 116 can include a database of predefined prompts, which can each be related to an editing capability of the computing system 100. For example, a prompt may include a basic description of a given tool, a typical question related to the tool, the defined input format to the tool, and/or possible intermediate steps when using the tool. Usage of a prompt pool 116 provides several advantages. One advantage includes the standardization of input. Another advantage includes flexibility in the expansion of the editing tool set. For example, when a new tool is added to the editing capabilities of the computing system, a corresponding prompt can be added to the prompt pool 116.

The prompt manager module 114 fills the retrieved prompt 118 with the editing request 112 and passes it on to an LLM agent 120. In some implementations, the computing system 100 includes a content asset analyzer 121 for processing the media content 110 to generate metadata that can be provided as input to the LLM agent 120. For example, the content asset analyzer 121 may pre-process video content to extract individual frames, analyze the visual content and audio content of the video content, and generate the video metadata, which can include textual descriptions of the analyzed visual and audio content, recognized entities, timestamps for key events, and video captioning of the video content.

The LLM agent 120 includes an LLM prediction module 122 that utilizes an LLM 124 for performing an inference prediction on the received input. The LLM 124 can be implemented as a language model formed from a trained neural network with a large number of parameters. The LLM 124 can be trained as a general-purpose model or for a limited range of tasks. For example, a media content editing architecture can be implemented with a single general-purpose trained LLM or with multiple LLMs that are each trained for different tasks. In some implementations, a set of LLMs, each trained for a specific range of tasks, are provided, and the LLM agent 120 selects the LLM to use based on the received prompt 118. The use of a prompt 118 along with the user's editing request 112 provides structure and context to the input to the LLM 124. As such, the input can be somewhat predictable in terms of structure, enabling the LLM 124 to provide more accurate inference predictions. The LLM agent 120 can be configured to provide an interactive text conversation with the user 108, where a dialog reply 126 is generated using the LLM 124 and provided back to the user 108 through the dialog interface 106. The user 108 can then provide new text input to advance the conversation. The conversation continues until the LLM agent 120 determines to terminate the conversation, which can be based on the new text input and/or the current number of rounds in the conversation. Upon termination of the conversation, the LLM prediction module 122 produces an inference prediction using the LLM 124 based on the received textual input(s).

The LLM agent 120 includes an action planning and execution module 128 that parses the inference prediction to produce a list of editing action(s). Possible editing actions can be selected from a tool database 130 that lists the editing tools available to the computing system 100 for use in editing the media content 110. The tool database 130 is provided in a back-end service 132 that includes tools 134 and associated APIs 136. Tools for editing media content can include, but are not limited to, tools for adding, removing, and/or modifying content in various modalities, such as text, image, video, audio, etc. For example, a tool can be implemented to embed an audio recording in video content. In some implementations, added content is created using a generative process.

The action planning and execution module 128 executes the list of editing action(s) using the appropriate API 136 calls for the tools 134 needed to perform the editing action (s). The editing action(s) are performed on the media content 110 provided by the user 108, and the edited media content 138 is provided back to the user 108 through the dialog assisted editing interface 104 where renderings of the edited media content 138 are displayed for the user 108 to view to determine their next action. For example, the user 108 may decide to revert the edits performed, provide a new editing request 112 for additional edits, or publish 140 the edited media content 138. Upon publication 140, a copy of the edited media content 138 can be stored on a content server 142. In the depicted example of FIG. 1, the published media content 144 is provided on the social network client 102 for viewing by other users 146 of the platform.

In some implementations, the media content editing architecture includes a system evolving process that refines its ability to suggest and/or perform actions/edits more effectively. Various types of feedback can be utilized for the system evolving process. For example, direct user feedback (e.g., the user 108 can provide feedback in the form of a rating system that attributes effectiveness to the prompt and/or tools used in performing the edits). Another example of feedback includes the use of the conversation history and/or contextual information of successful submissions (e.g., published media content 144). Different reward functions can be used to determine the amount of influence of a given refinement iteration. In the illustrated example of FIG. 1, the computing system 100 includes a platform viewer engagement aggregation module 148 for providing information on viewer engagement indicators with respect to a published media content 144. Example indicators include the number of views/listens, comments, shares, likes, etc. Higher viewer engagement indicators imply a more "successful" edited media content. As such, greater weight can be given to information used in the refinement process related to published media content with higher viewer engagement indicators. For example, upon reaching a predetermined threshold of viewer engagement indicators (e.g., a predetermined number of video views within a predetermined time frame), the refinement process can be performed with respect to the published media content that reached said threshold.

The refinement process can be performed for various modules in the architecture. In the example of FIG. 1, the computing system 100 includes a prompt refinement module 150 for refining the prompt pool 116. The computing system 100 further includes an LLM finetune module 152 for refining the LLM 124. Conversation history and/or contextual information of a given published media content can be used to refine the prompt pool 116 and/or LLM 124. For example, providing every editing option for a given prompt can be impractical. As such, a set of available options is typically provided for a given prompt. Refinement of the prompt pool can influence the set of options provided to the user. By using high viewer engagement indicators as a proxy for success of an edited media content, the conversation history and/or contextual information related to the editing of said media content can be used to refine options provided in a given prompt such that more "popular" options are provided. As a more specific example, a prompt can initially include options regarding different music genres in response to a user request to embed music into a video content. The prompt can later be refined to include options of more popular genres based on published content that showed high viewer engagement indicators when edited to embed music of said popular genres. In this way, the computing system 100 can be continuously updated to better respond to user's editing requests.

Figure 2:
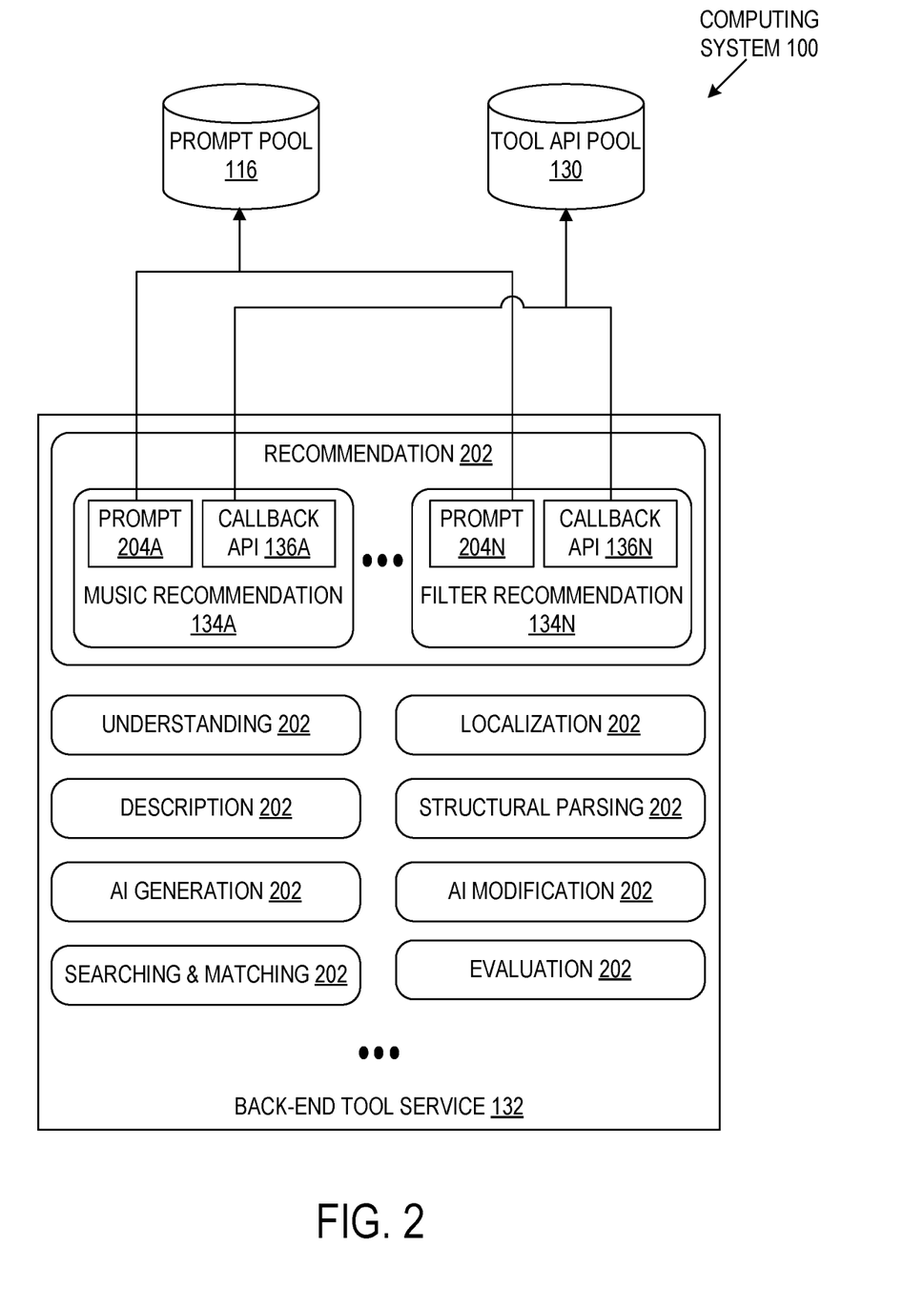
FIG. 2 is a block diagram model illustrating an example back-end tool service for providing editing tools and editing capabilities, which can be implemented in the general pipeline described in FIG. 1.

FIG. 2 is a block diagram illustrating aspects of an example configuration of computing system 100 of FIG. 1. FIG. 2 illustrates an example back-end tool service 132 for providing editing tools and editing capabilities that can be used in the computing system 100. The example back-end tool service 132 provides back-end support and capabilities with which an LLM agent can use for performing edits to media content (e.g., action planning and execution module 128 may use the back-end tool service 132 to perform edits on media content 110).

The back-end tool service 132 includes a repository of available editing tools/capabilities for the media content editing architecture. In some implementations, the tools are arranged and organized within groups. In further implementations, the tools are organized within several levels of hierarchies. Such organization schemes allow for conversational interactions that present the user with a practical number of options for a given selection. For example, instead of listing every available tool for the user to select, groupings can be provided first to narrow down and give better context to the user's desired edits.

In the depicted example of FIG. 2, the tools 134 are organized into groups 202. For example, a music recommendation tool 134A and a filter recommendation tool 134N are shown to be organized under a recommendation 202 group umbrella. Other groups and classifications shown include understanding, description, artificial intelligence (AI) generation, search & matching, localization, structural parsing, AI modification, and evaluation. Each grouping can include various editing capabilities across various modalities, such as image, video, music, text, and voice. Example capabilities for the understanding grouping can include content embedding and tagging. Example capabilities for the localization grouping can include object detection, event detection, letter recognition, object segmentation, event/scene detection, and beats/chorus/onset detection. Example capabilities for the description grouping can include image caption, video caption, title generation, and text summarization. Example capabilities for the structure parsing grouping can include slicing (shot boundary) and highlight detection. Example capabilities for the AI generation grouping can include various generative processes for content creation, such as image generation, video generation, music generation, and video script generation. Example capabilities for the AI modification grouping can include trimming, volume adjustment, voice changing, denoising, superresolution, cropping, background removal, tone mapping, inpainting, video-audio sync, and curve speed. Example capabilities for the search & matching grouping can include material searching and material replacement. Example capabilities for the recommendation grouping can include recommendations and applications of various content, such as filters, music, titles, narrative speech, animation, special effects, stickers, and text (including different fonts, styles, animation, and positions). Example capabilities for the evaluation grouping can include image quality, video quality, and music quality. As can readily be appreciated, the back-end tool service 132 can include any number of groupings 202 using any classification scheme. Additionally, each grouping 202 can include any number of tools 134, which can further be classified into sub-groupings in some examples.

Each tool 134 includes information describing a callback API 136 that can be used by an LLM agent to call upon the editing tool to perform edits on a media content. The collection of callback APIs 136 is aggregated within the tool API pool 130, which acts as a repository that can be accessed by the LLM agent. For example, as shown in FIG. 1, the action planning and execution module 128 utilizes tool API pool 130 to execute the list of editing actions it generated to form edited media content 138.

For each tool 134, a corresponding prompt 204 is generated. The collection of prompts 204 is aggregated within the prompt pool 116, which can, in some examples, be accessed by a prompt manager during prompt retrieval. A prompt 204 can be formatted in various ways. In some implementations, a prompt 204 for a given tool includes a basic description of the tool, a typical question related to the tool, a defined input format to the tool, and/or intermediate steps when using the tool. The back-end tool service 132 can be implemented dynamically with the capability of adding and removing tools 134. As a new tool 134 is added, a corresponding prompt 204 can be generated and added to the back-end tool service 132 and, consequently, the prompt pool 116.

Figure 3:
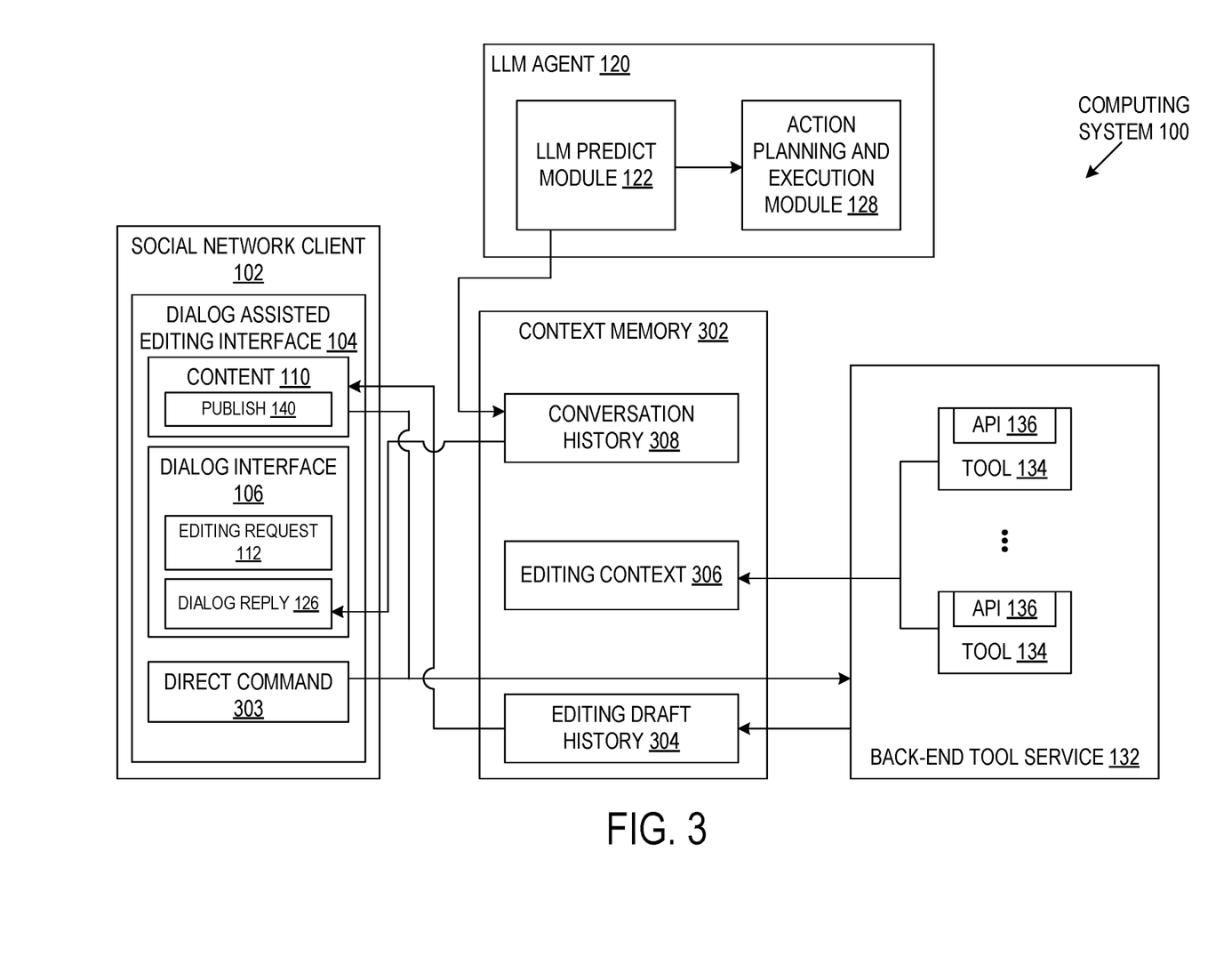
FIG. 3 is a block diagram model illustrating an example use of contextual memory 302 in a media content editing architecture, which can be implemented in the general pipeline described in FIG. 1.

FIG. 3 is a block diagram illustrating aspects of an example configuration of computing system 100 of FIG. 1. FIG. 3 illustrates an example use of contextual memory 302 in a media content editing architecture that can be used in the computing system 100. Directed connections are illustrated to show relationships between components related to the contextual memory 302. One straightforward method for editing media content 110 includes a direct command 303 given by a user through the dialog assisted editing interface 104. The direct command 303 describes a specific editing action that the user desires and is formatted such that the media content editing architecture understands the given command without the use of an LLM or the LLM agent 120. As such, the direct command 303 enables the user to directly call an editing tool from the back-end tool service 132 to perform edits on the media content 110. For more sophisticated, unstructured queries, the contextual memory 302 can be used to store contextual information to help guide the editing process.

The contextual memory 302 can include storage of various contextual information that can be used by the media content editing architecture for various purposes. For example, during editing of the media content by the action planning and execution module 128, an editing draft history 304 can be compiled based on a list of nonlinear edits and associated editing tools. The editing draft history 304 can include the steps and edits for rendering the edited media content to the user through the dialog assisted editing interface 304. The context memory 302 further includes editing context 306 that provides context to the tools and editing capabilities provided by the back-end tool service 132.

Conversational interactions between the user and the LLM can also be stored. In the depicted example of FIG. 3, conversation history 308 is stored in the context memory 302. For example, dialog can be stored when conversational input is provided to the LLM agent 120 and when the LLM predict module 122 produces a dialog reply 126 using an LLM. Conversation history 308 can be used for various purposes. During the editing process, conversation history 308 can provide information to the media content editing architecture to determine how many rounds of edits have been performed. In some implementations, the media content editing architecture is configured to suggest publication of the edited content 110 after a certain amount of conversational back-and-forth and/or rounds of edits. Another use includes prompt suggestion based on the previous interactions in the conversation. For example, a previous interaction where the user rejected the suggested edits can be stored in the conversation history 308, and the media content editing architecture can be configured to less likely provide a related prompt.

In some implementations, the conversation history 308 and/or editing draft history 304 can be utilized to train or refine the media content editing architecture, which can include refinement of the prompt pool and/or LLM. The conversation history 308 and/or editing draft history 304 can be stored for each user submission, and their contents can be used to refine the prompt pool and/or LLM. For example, a published edited media content with high viewer engagement indicators can be considered as a training sample for the refinement process. The conversation history 308 and/or editing draft history 304 for said published edited media content can be used to refine the prompt pool and/or LLM such that the prompts and dialog replies 126 associated with published edited media content are more likely to appear in future interactions.

Figure 4:
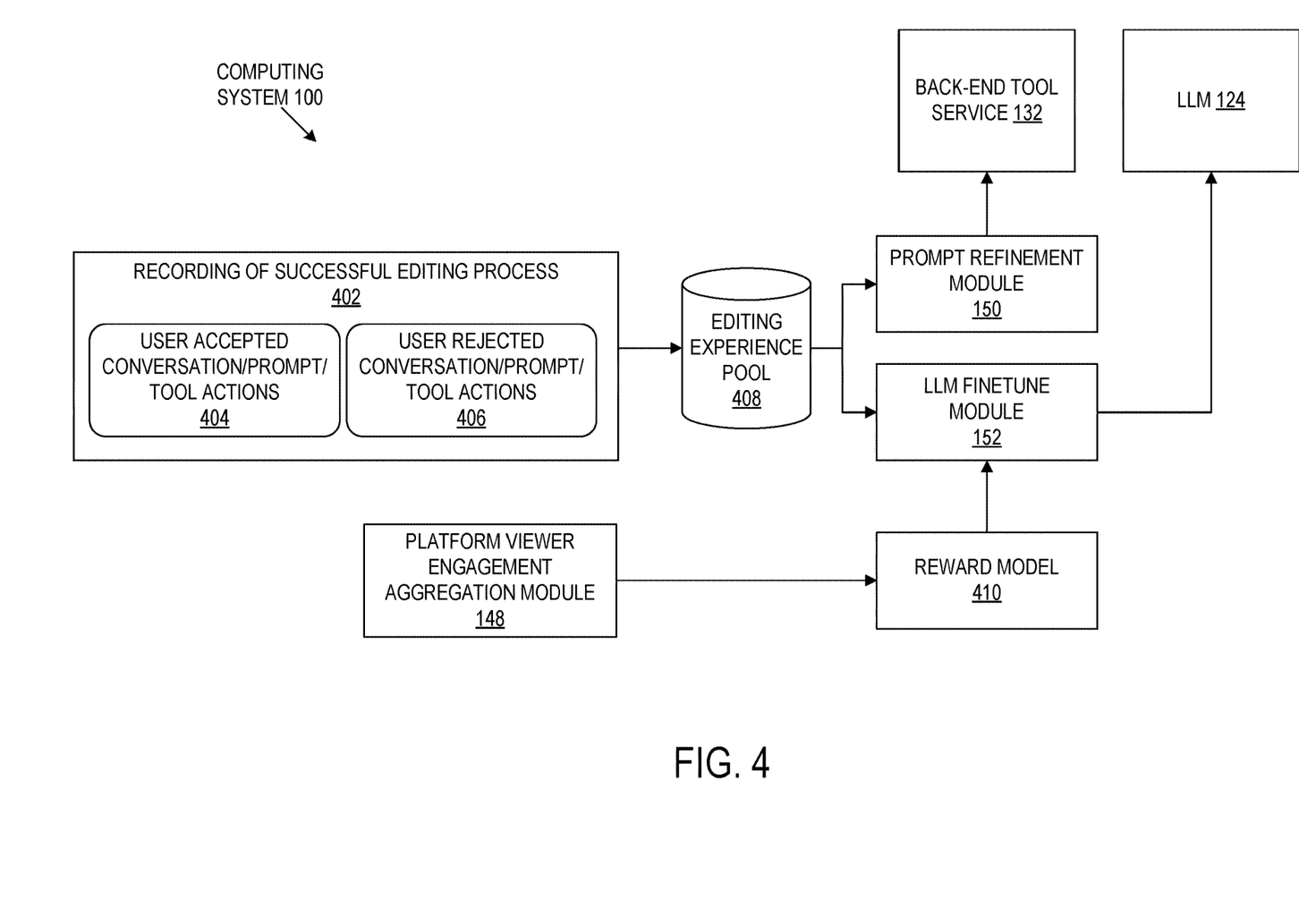
FIG. 4 is a block diagram model illustrating an example system evolving and refinement application for a media content editing architecture, which can be implemented in the general pipeline described in FIG. 1.

FIG. 4 is a block diagram illustrating aspects of an example configuration of computing system 100 of FIG. 1. FIG. 4 illustrates an example system evolving and refinement application for a media content editing architecture that can be used in the computing system 100. In the depicted example of FIG. 4, the example system evolving and refinement process is performed for the back-end tool service 132 and the LLM 124. Various processes can be used for refinement of the media content editing architecture. In some implementations, reinforcement learning algorithms such as reinforcement learning from human feedback (RLHF) and proximal policy optimization (PPO) are implemented. For example, information recorded from successful editing processes 402 can be used to refine the LLM 124 and the prompts provided by the back-end tool service 132 to provide more relevant prompts and responses in future interactions with a user. Recordings of successful editing processes can be provided at various stages of the editing process. Various information can be recorded, such as conversation history and contextual information (e.g., description of the assets). The prompt/query and response pairs in such information can be used as training samples for the refinement process. The conversation history can include both successful conversion and less successful conversation results. For example, as described in FIG. 3, a contextual memory 302 can be implemented to store various information regarding an editing process, such as the conversation history 308, editing draft history 304, editing context 306, etc.

A "successful" editing process can be defined in various ways. In some implementations, an editing process is considered successful upon publication of the edited media content. At that point, information, such as the conversation history 308 and the editing draft history 304, related to the editing process is recorded. In other implementations, every editing process interaction with users is recorded. However, this may produce vast amounts of unwanted data with little influence on whether the prompts and tool suggestions were effective. In yet other implementations, editing processes of published edited media content reaching a predetermined threshold of viewer engagement are considered successful.

In the depicted example of FIG. 4, the information recorded for a given successful editing process is organized into user accepted interactions 404 and user rejected interactions 406. Such interactions can include user responses to suggested edits and tool options provided by the prompt manager and/or LLM agent. The model 400 includes an editing experience pool 408 that aggregates the recordings of successful editing processes 402, which includes the user accepted and rejected interactions 404, 406. The aggregated information within the editing experience pool 408 can be used by a prompt refinement module 150 to refine the back-end tool service 132. More specifically, the editing experience pool 408 can be used to refine prompts provided by the back-end tool service 132. For example, a prompt may be modified in accordance with information in the editing experience pool 408 describing efficient and inefficient prompts, which can be correlated to user accepted and rejected interactions 404, 406, respectively. User accepted interactions 404 can provide context implying that prompts accepted by the user are likely to result in more successful editing processes. As such, similar prompts can be configured to be suggested more often for future interactions. Similarly, prompts associated with user rejected interactions 406 can be modified accordingly or configured to be suggested less often in further interactions.

The aggregated information within the editing experience pool 408 can also be used by an LLM finetune module 152 to refine the LLM 124. Similar to the prompt refinement module 150, the LLM finetune module 152 can utilize information in the editing experience pool describing efficient and inefficient interactions as positive and negative reinforcement data, respectively, to refine the LLM 124. In some implementations, a reward function is implemented to determine the extent of the influence the information in the editing experience pool has on the refinement process. Various reward models can be implemented. In the depicted example of FIG. 4, online performance data is utilized as a reward model 410 to refine the LLM 124. Online performance data of a published edited media content can be quantified using various viewer engagement metrics and indicators, such as views, likes, shares, comments, etc. A platform view engagement aggregation module 148, such as the one illustrated and described with respect to FIG. 1, can be used to aggregate the relevant viewer engagement indicators for published edited media content from the hosting service of said published edited media content. Such data can be fed into the reward model 410 to determine the weight of the training samples (information in the editing experience pool 408) in the refinement process. Although FIG. 4 depicts the evolving and refinement system as utilizing online performance data as a reward model for the refinement of the LLM 124, such models can also be used in for the refinement of prompts in the back-end tool service 132.

Figure 5:
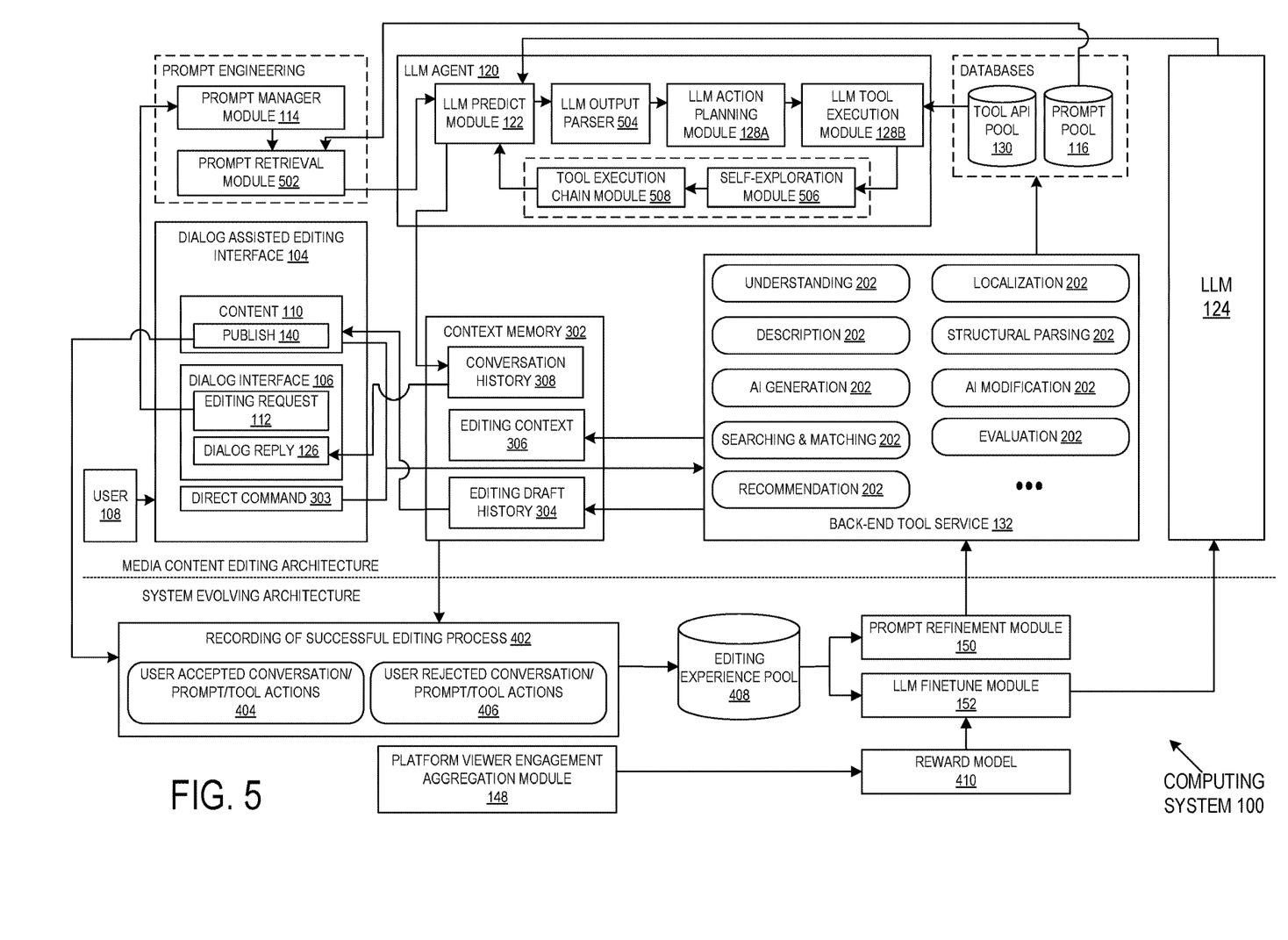
FIG. 5 is a block diagram model illustrating an example media content editing model architecture with a system evolving and refinement process, which provides a detailed illustration of the general pipeline described in FIG. 1.

FIG. 5 is a block diagram that illustrates an example media content editing model architecture with a system evolving and refinement process, that can be used with the computer system 100 of FIG. 1. FIG. 5 provides a detailed illustration of the pipeline flow of a conversational, nonlinear editing process using the example content editing model architecture. The process starts with a user 108 interacting with a dialog assisted editing interface 104 and providing media content 110 to be edited. The media content 110 can be of any modality, including image, audio, video, etc. In some implementations, the media content 110 is generated by the example media content editing model architecture through a generative AI process. The dialog assisted editing interface 104 can be implemented on any computing device. In some implementations, the dialog assisted editing interface 104 is provided within a social network client, such as social network client 102 depicted in FIG. 1. The social network client can include various social networking platforms such as a short-form video social media platform, as described above.

The dialog assisted editing interface 104 provides an interface where the user 108 can view the media content 110 during the editing process, such as rendering results of selected edits. Additionally, the dialog assisted editing interface 104 includes a dialog interface 106 that can transmit and receive text commands. The editing process includes the user 108 providing an editing request 112 using the dialog interface 106. The editing request 112 is provided to a prompt manager module 114. As the editing capabilities of the example media content editing model architecture may include numerous editing tools, a prompt manager module 114 can be implemented to help structure and narrow the editing request to a subset of the architecture's editing capabilities. Through prompt engineering, the prompt manager module 114 and a prompt retrieval module 502 operate to retrieve a prompt from a prompt pool 116. The retrieved prompt is typically related to the editing request 112. For example, if the editing request 112 is related to music, the prompt retrieval module 502 can query the prompt pool 116 to retrieve a prompt related to music. In some implementations, the query provides a set of prompts with similar descriptions to match the editing request 112, and the set of prompts is combined with the fixed prompt for the tool related to the editing request 112 to form a new prompt.

Generally, the prompt pool 116 includes at least one prompt corresponding to each editing capability. The prompt pool 116 can be implemented as a dynamic database to which prompts can be added, deleted, and modified, providing flexibility in the expansion of the architecture's editing tool set. For example, when a new tool is registered to the tool set, a corresponding prompt can also be added to the prompt pool 116. A prompt can be formatted in various ways. In some implementations, the prompt includes the basic description of a tool, a typical question related to the tool, the defined input format to the tool, and/or possible intermediate steps when using the tool.

The editing request 112 and retrieved prompt can be fed to an LLM predict module 122 of an LLM agent 120, which uses an LLM 124 for performing inference predictions. The LLM agent 120 can be implemented as a text command transmitter/receiver that provides conversational interactions with the user 108, where the LLM agent 120 uses the LLM 124 to predict a response to a text input (editing request 112 and prompt) it receives. As the prompts are generally predefined, the LLM 124 can output structured result. In some implementations, the LLM 124 is a single general purpose LLM. In other implementations, the LLM agent 120 has access to a repository of LLMs, each trained for one or more specific tasks. In such cases, choice of which LLM to used can be based on the editing request 112 and/or prompt.

The LLM agent 120 can be configured to translate the structured results from the LLM 24 into a tool execution sequence and the inputs for execution of said tools. The LLM agent 120 includes an LLM output parser 504 that parses the predicted response from the LLM predict module 122, retrieving the structured information within the predicted response. The LLM agent 120 further includes an LLM action planning module 128A and an LLM tool execution model 128B. The LLM action planning module 128A and the LLM tool execution model 128B may be implemented similarly to the action planning and execution module 128 of FIG. 1. The LLM action planning module 128A can be implemented to plan actions to be taken based on the structured information. Based on the planned actions, the LLM tool execution module 128B forms a tool chain and executes said tool chain using API calls from a tool API pool 130 for the tools in the tool chain. For open questions or complicated requests, the LLM agent 120 can use the LLM 124 to perform a self-exploration and generate several intermediate steps using a self-exploration module 506 and tool execution chain module 508, respectively. For each step, the LLM 124 can exploit searching or follow-up questioning to approach the final answer gradually. Conversational back-and-forth text can be implemented. For example, a dialog reply 126 and subsequent responses can be provided to the user 108 through the dialog interface 106 of the dialog assisted editing interface 104. In some implementations, dialog replies are stored in a context memory 302 that records conversation history 308.

Upon execution of a tool chain, API calls to tools in the tool chain are utilized to perform editing of the media content 110. The back-end tool service 132 provides the editing capabilities and performs the editing steps, storing said steps in an editing draft history 304 in the context memory 302. The edited media content is provided to the user 108 through the dialog assisted editing interface 104, and the user 108 can determine their next course of action. For example, the user 108 can device to revert the edits, provide additional editing requests, or publish 140 the edited media content.

The model 500 includes a system evolving architecture that enables a refinement process for the media content editing architecture. The refinement process can be implemented using similar components and methods described with respect to FIG. 4. In the depicted example of FIG. 5, a prompt refinement module 150 and an LLM finetune module 152 are implemented to refine prompts within the back-end tool service 132 and the LLM 124, respectively. Training data for the refinement process can include various contextual information stored during the editing process. For every submission (set of interactions with a user 108 for a given media content 110), conversation history 302 as well as contextual information, such as the description of the assets, can be stored within the context memory 302. This conversation history can include both successful conversion and less successful conversation results. In some implementations, only successful submissions are saved. "Successful" submissions can be defined in various ways. For example, a submission can be considered successful upon publication 140 of the edited media content.

Upon publication of an edited media content, recordings of successful editing processes 402 are retrieved. Such recordings can include contextual data stored during the editing process for said edited media content, such as data stored in the context memory 302. The contextual data can, in some examples, be separated into user accepted interactions 404 and user rejected interactions 406. Such interactions can include user responses to suggested edits and tool options. An editing experience pool 408 aggregates the contextual data, which is then used by the prompt refinement module 150 and the LLM finetune module 152 to refine the back-end tool service 132 and the LLM 124, respectively.

A reward model 410 can be implemented to assign different weights to the training data. The reward can be based on various criteria. In the depicted example of FIG. 5, online performance data in the form of viewer engagement indicators are utilized as the reward function. Higher viewer engagement indicates a higher reward for the training data (contextual data) that produced the published edited content. Viewer engagement indicators can include various metrics related to the online performance data of the published edited media content. Example indicators include views, likes, shares, comments, etc. A platform view engagement aggregation module 148, such as the one illustrated and described with respect to FIG. 1, can be used to aggregate the relevant viewer engagement indicators for published edited media content from the hosting service of said published edited media content. In some implementations, the reward model 410 is also similarly applied to the prompt refinement module 150.

Figure 6:
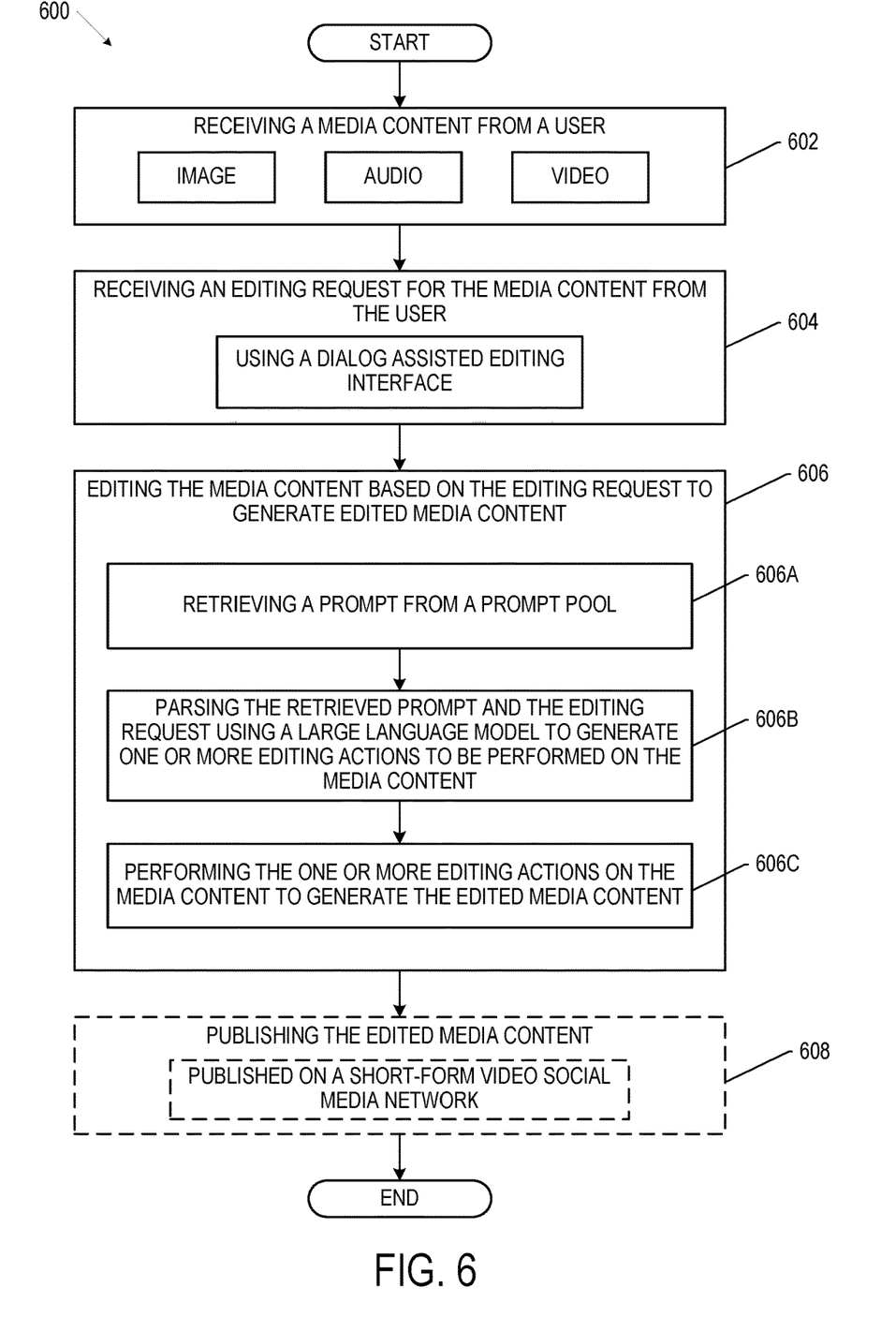
FIG. 6 is a flow chart illustrating an example method for a media content editing process using machine learning techniques, which can be implemented using the technical architecture of FIG. 1.

FIG. 6 is a flow chart illustrating an example method 600 for a media content editing process using machine learning techniques. Such a method can be performed on a media content editing architecture, such as the one illustrated and described in FIG. 5. At step 602, the method 600 includes receiving a media content from a user. Various types of media content and modalities can be utilized. For example, the media content can be an image, an audio recording, or a video. The media content can be provided by the user, such as through an uploading process. In some implementations, the media content is provided by a generative AI process.

At step 604, the method 600 includes receiving an editing request for the media content from the user. The editing request can be received from a user through the use of a dialog assisted editing interface. Generally, the editing request is received in the form of textual input. The editing request can be received through the use of a prompt manager module. The editing request may include a request to revert previous edits made to the media content. In some implementations, the editing request may be a direct command in a structured format that allows direct access to editing tools by the media content editing architecture.

At step 606, the method 600 includes editing the media content based on the editing request to generate edited media content. Editing of the media content can be performed using various processes. Substeps 606A-606C describe one such process. At substep 606A, the method 600 includes retrieving a prompt from a prompt pool. The prompt may be retrieved through the use of a prompt manager module. The prompt pool can include a plurality of prompts, where each prompt corresponds to at least one editing tool.

At substep 606B, the method 600 includes parsing the retrieved prompt and the editing request using a large language model to generate one or more editing actions to be performed on the media content. An LLM agent can be used to receive the input and to feed said input into the large language model. The use of a prompt can allow for a more structured input such that the large language model is able to provide more consistent responses. The large language model can be configured to parse the input to generate the one or more editing actions in the form of an action tool list.

At substep 606C, the method 600 includes performing the one or more editing actions on the media content to generate the edited media content. Performing the editing actions can include the use of API calls to corresponding editing tools. The APIs can be retrieved from a tool API pool.

At step 608, the method 600 includes optionally includes publishing the edited media content. The edited media content can be published on various platforms. For example, the edited media content can be published on a short-form video social media network.

Figure 7:
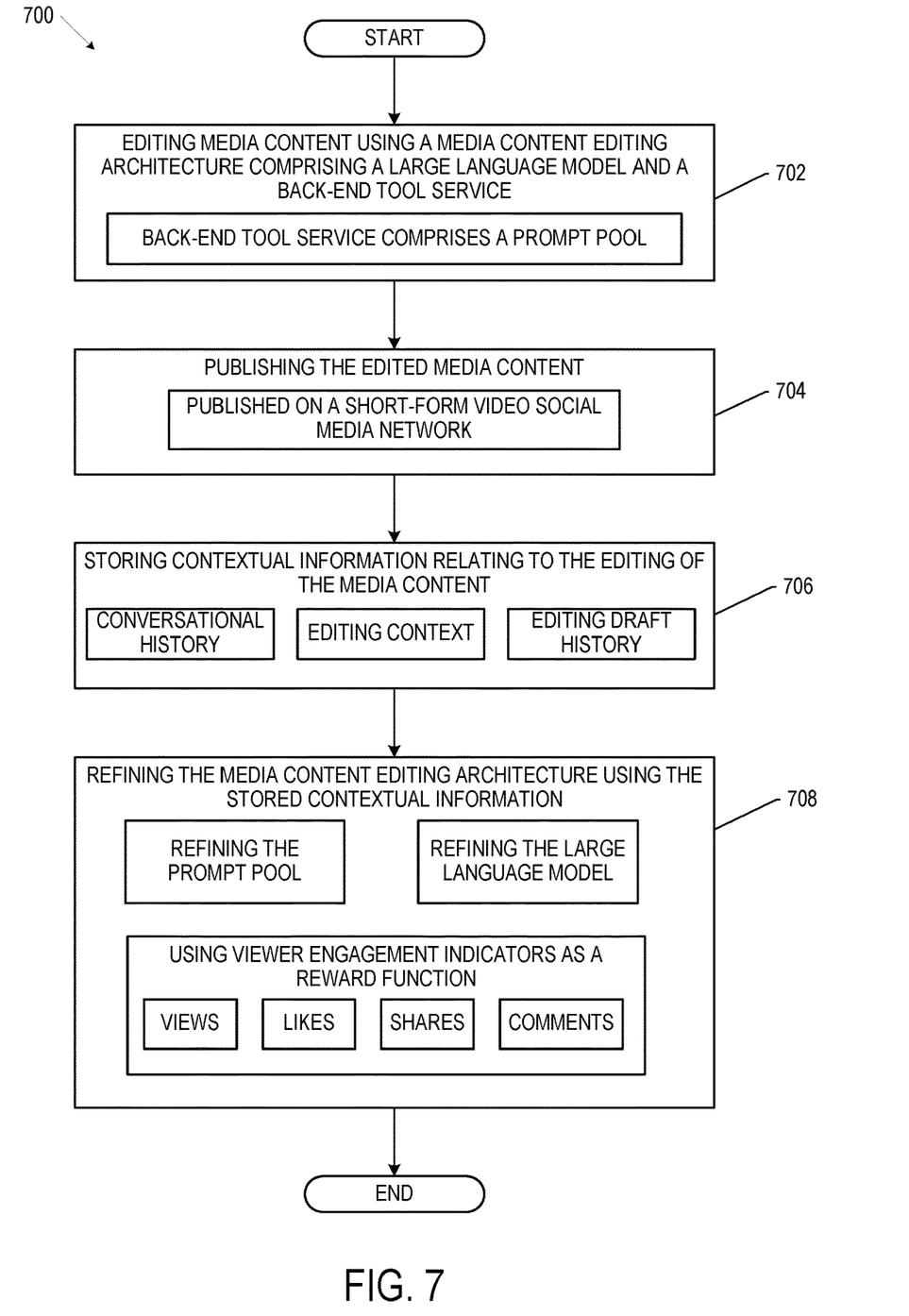
FIG. 7 is a flow chart illustrating an example method for refining a media content editing architecture, which can be implemented using the technical architecture of FIG. 1.

FIG. 7 is a flow chart illustrating an example method 700 for refining a media content editing architecture. Refining a media content editing architecture can be implemented using a system evolving architecture, such as the one illustrated and described in FIG. 4. At step 702, the method 700 includes editing media content using a media content editing architecture, such as the one illustrated and described in FIG. 5. The method described in FIG. 6 may also be used to edit the media content. Various types of media content and modalities can be utilized. For example, the media content can be an image, an audio recording, or a video. The media content editing architecture can include a large language model and a back-end tool service. The back-end tool service can include a prompt pool.

At step 704, the method 700 includes publishing the edited media content. The edited media content can be published on various platforms. For example, the edited media content can be published on a short-form video social media network.

At step 706, the method 700 includes storing contextual information relating to the editing of the media content. Examples of contextual information include conversational history, editing context, and editing draft history. In some implementations, the contextual information includes asset descriptions of the edited media content. In some implementations, the contextual information is stored in a contextual memory. The contextual information can be used for various purposes. During the editing process, the contextual information is aware of historic action of the editing process, which can influence the dialog replies of the media content editing architecture. For example, if the contextual information includes conversational history where a user has rejected a given proposed edits, the media content editing architecture can be configured to not suggest said edit for the given editing process. Another use of the contextual information includes refinement of the media content editing architecture.

At step 708, the method 700 includes refining the media content editing architecture using the stored contextual information. Refining the media content editing architecture can include refining the prompt pool and/or the large language model. In some implementations, the stored contextual information includes conversation history that is categorized into user accepted interactions and user rejected interactions, and refining the media content editing architecture includes refining the prompt pool based on the user accepted interactions and user rejected interactions. For examples, prompts in the prompt pool may be refined to suggest related editing actions corresponding to the user accepted interactions compared to the user rejected interactions. The refinement process can include the use of viewer engagement indicators associated with the published edited media content as a reward function. Example viewer engagement indicators include views, likes, shares, and comments. In some implementations, the refinement process is performed upon reaching a predetermined threshold of viewer engagement indicators (e.g., a predetermined number of video views within a predetermined time frame).

In some embodiments, the methods and processes described herein may be tied to a computing system of one or more computing devices. In particular, such methods and processes may be implemented as a computer-application program or service, an application-programming interface, a library, and/or other computer-program product.

Figure 8:
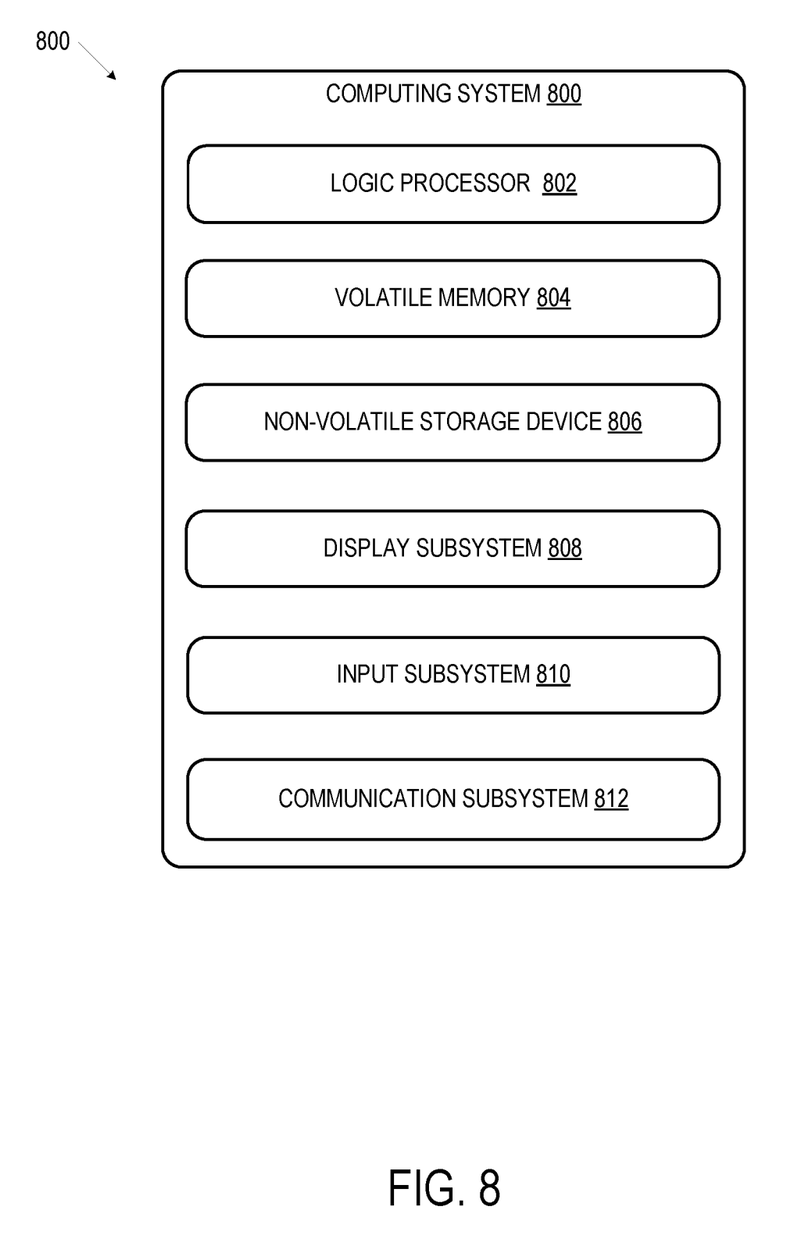
FIG. 8 schematically shows a non-limiting embodiment of a computing system that can enact one or more of the methods and processes described above.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Media content editing architectures can be implemented to provide an intuitive editing tool and experience for the average user. Using LLMs in combination with a wide set of editing tools enables the user to make powerful edits to media content without extensive software knowledge. Such architectures can receive input from the user as unstructured text and, along with the use of prompts and natural language processing techniques, predict the desired editing request and perform said prediction using a pool of available editing tools. Further implementations can include refinement of such technical architectures. Using online performance data of published edited content enables the system to evolve and refine itself without the costly and labor intensive training process of traditional LLM models.

Computing system 800 includes a logic processor 802 volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built in. Non-volatile storage device 806 may include optical memory (e.g., CD, DVD, HD-DVD, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 typically implemented in software by a processor to perform a particular function using portions of volatile memory, which function involves transformative processing that specially configures the processor to perform the function. Thus, a module, program, or engine may be instantiated via logic processor 802 executing instructions held by non-volatile storage device 806, using portions of volatile memory 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; and/or any other suitable sensor.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

The following paragraphs provide additional description of the subject matter of the present disclosure. One aspect provides for a method of refining a media content editing architecture, the method comprising: editing a media content using a large language model and a back-end tool service comprising a prompt pool and a plurality of application programming interfaces corresponding to a plurality of editing tools; publishing the edited media content; storing contextual information relating to the editing of the media content; and refining the media content editing architecture using the stored contextual information. In this aspect, additionally or alternatively, refining the media content editing architecture comprises refining the large language model and the prompt pool. In this aspect, additionally or alternatively, the stored contextual information comprises conversation history that is categorized into user accepted interactions and user rejected interactions, and wherein refining the media content editing architecture comprises refining the prompt pool based on the user accepted interactions and user rejected interactions. In this aspect, additionally or alternatively, refining the media content editing architecture comprises refining the large language model using the contextual information and a reward function. In this aspect, additionally or alternatively, the reward function is based on one or more viewer engagement indicators associated with the published edited media content. In this aspect, additionally or alternatively, the one or more viewer engagement indicators comprise a metric that is one or more of views, likes, shares, or comments. In this aspect, additionally or alternatively, refining the large language model comprises refining the large language model using the contextual information when the one or more viewer engagement indicators reach a predetermined threshold. In this aspect, additionally or alternatively, the predetermined threshold comprises reaching a predetermined number of views within a predetermined amount of time since publication of the edited media content. In this aspect, additionally or alternatively, the contextual information comprises one or more of conversation history, editing context, or editing draft history. In this aspect, additionally or alternatively, the media content is published on a short-form social media platform. Further in this aspect, a non-transitory computer readable medium is provided including instructions that, when executed by a computing device, cause the computing device to implement the method described herein.

Another aspect provides for a computing device for refining a media content editing architecture, the computing device comprising: a processor and memory of a computing device, the processor being configured to execute a program using portions of the memory to: edit a media content using a large language model and a back-end tool service comprising a prompt pool and a plurality of application programming interfaces corresponding to a plurality of editing tools; publish the edited media content; store contextual information relating to the editing of the media content; and refine the media content editing architecture using the stored contextual information. In this aspect, additionally or alternatively, the stored contextual information comprises conversation history that is categorized into user accepted interactions and user rejected interactions, and wherein refining the media content editing architecture comprises refining the prompt pool based on the user accepted interactions and user rejected interactions. In this aspect, additionally or alternatively, refining the media content editing architecture comprises refining the large language model using the contextual information and a reward function. In this aspect, additionally or alternatively, the reward function is based on one or more viewer engagement indicators associated with the published edited media content, and wherein the one or more viewer engagement indicators comprise a metric that is one or more of views, likes, shares, or comments. In this aspect, additionally or alternatively, the contextual information comprises one or more of conversation history, editing context, or editing draft history.

Another aspect provides for a computing system for refining a media content editing architecture, the computing system comprising: a social media network application comprising a dialog assisted editing interface; memory storing one or more large language models; a processor configured to execute a program using portions of the memory to: edit a media content using the dialog assisted editing interface, the one or more large language models, and a back-end tool service comprising a prompt pool and a plurality of application programming interfaces corresponding to a plurality of editing tools; publish the edited media content using the social media network application; store contextual information in the memory, wherein the contextual information relates to the editing of the media content; and refine the media content editing architecture using the stored contextual information. In this aspect, additionally or alternatively, the contextual information comprises conversation history that is categorized into user accepted interactions and user rejected interactions, and wherein refining the media content editing architecture comprises refining the prompt pool based on the user accepted interactions and user rejected interactions. In this aspect, additionally or alternatively, refining the media content editing architecture comprises refining the one or more large language models using the contextual information and a reward function. In this aspect, additionally or alternatively, the reward function is based on one or more viewer engagement indicators associated with the published edited media content, and wherein the one or more viewer engagement indicators comprise a metric that is one or more of views, likes, shares, or comments.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of refining a media content editing architecture, the method comprising:
    editing a media content using a large language model and a back-end tool service comprising a prompt pool and a plurality of application programming interfaces corresponding to a plurality of editing tools;
    publishing the edited media content;
    storing contextual information relating to the editing of the media content; and
    refining the media content editing architecture using the stored contextual information, wherein refining the media content editing architecture comprises training the large language model based on a predetermined threshold comprising reaching a predetermined number of views within a predetermined amount of time since publication of the edited media content.

2. The method of claim 1, wherein refining the media content editing architecture comprises refining the prompt pool.

3. The method of claim 1, wherein the stored contextual information comprises conversation history that is categorized into user accepted interactions and user rejected interactions, and wherein refining the media content editing architecture comprises refining the prompt pool based on the user accepted interactions and user rejected interactions.

4. The method of claim 1, wherein the large language model is trained using the contextual information and a reward function.

5. The method of claim 4, wherein the reward function is based on one or more viewer engagement indicators associated with the published edited media content.

6. The method of claim 5, wherein the one or more viewer engagement indicators comprise a metric that is one or more of views, likes, shares, or comments.

7. The method of claim 5, wherein training the large language model comprises training the large language model using the contextual information when the one or more viewer engagement indicators reach the predetermined threshold.

8. The method of claim 1, wherein the plurality of editing tools is organized into levels of hierarchy.

9. The method of claim 1, wherein the contextual information comprises one or more of conversation history, editing context, or editing draft history.

10. The method of claim 1, wherein the media content is published on a short-form social media platform.

11. A computing device for refining a media content editing architecture, the computing device comprising:
    a processor and memory of a computing device, the processor being configured to execute a program using portions of the memory to:
        edit a media content using a large language model and a back-end tool service comprising a prompt pool and a plurality of application programming interfaces corresponding to a plurality of editing tools;
        publish the edited media content;
        store contextual information relating to the editing of the media content; and refine the media content editing architecture using the stored contextual information, wherein refining the media content editing architecture comprises training the large language model based on a predetermined threshold comprising reaching a predetermined number of views within a predetermined amount of time since publication of the edited media content.

12. The computing device of claim 11, wherein the stored contextual information comprises conversation history that is categorized into user accepted interactions and user rejected interactions, and wherein refining the media content editing architecture comprises refining the prompt pool based on the user accepted interactions and user rejected interactions.

13. The computing device of claim 11, wherein the large language model is trained using the contextual information and a reward function.

14. The computing device of claim 13, wherein the reward function is based on one or more viewer engagement indicators associated with the published edited media content, and wherein the one or more viewer engagement indicators comprise a metric that is one or more of views, likes, shares, or comments.

15. The computing device of claim 11, wherein the contextual information comprises one or more of conversation history, editing context, or editing draft history.

16. A computing system for refining a media content editing architecture, the computing system comprising:
 a social media network application comprising a dialog assisted editing interface;
 memory storing one or more large language models;
 a processor configured to execute a program using portions of the memory to:
  edit a media content using the dialog assisted editing interface, the one or more large language models, and a back-end tool service comprising a prompt pool and a plurality of application programming interfaces corresponding to a plurality of editing tools;
  publish the edited media content using the social media network application;
  store contextual information in the memory, wherein the contextual information relates to the editing of the media content; and
  refine the media content editing architecture using the stored contextual information, wherein refining the media content editing architecture comprises training the one or more large language models based on a predetermined threshold comprising reaching a predetermined number of views within a predetermined amount of time since publication of the edited media content.

17. The computing system of claim 16, wherein the contextual information comprises conversation history that is categorized into user accepted interactions and user rejected interactions, and wherein refining the media content editing architecture comprises refining the prompt pool based on the user accepted interactions and user rejected interactions.

18. The computing system of claim 16, wherein the one or more large language models are trained using the contextual information and a reward function.

19. The computing system of claim 18, wherein the reward function is based on one or more viewer engagement indicators associated with the published edited media content, and wherein the one or more viewer engagement indicators comprise a metric that is one or more of views, likes, shares, or comments.

20. A non-transitory computer readable medium for refining a media content editing architecture, the non-transitory computer readable medium comprising instructions that, when executed by a computing device, cause the computing device to implement the method of claim 1.

* * * * *